United States Patent
Makhlouf

(10) Patent No.: US 10,182,272 B2
(45) Date of Patent: Jan. 15, 2019

(54) SYSTEM AND METHOD FOR REINFORCING BRAND AWARENESS WITH MINIMAL INTRUSION ON THE VIEWER EXPERIENCE

(71) Applicant: Samir B Makhlouf, Atlanta, GA (US)

(72) Inventor: Samir B Makhlouf, Atlanta, GA (US)

(*) Notice: Subject to any disclaimer, the term of this patent is extended or adjusted under 35 U.S.C. 154(b) by 0 days.

(21) Appl. No.: 14/207,091

(22) Filed: Mar. 12, 2014

(65) Prior Publication Data

US 2014/0282698 A1    Sep. 18, 2014

Related U.S. Application Data

(60) Provisional application No. 61/852,114, filed on Mar. 15, 2013.

(51) Int. Cl.
| | | |
|---|---|---|
| *H04N 21/858* | (2011.01) | |
| *H04N 21/431* | (2011.01) | |
| *H04N 21/4725* | (2011.01) | |
| *H04N 21/81* | (2011.01) | |

(52) U.S. Cl.
CPC ....... *H04N 21/858* (2013.01); *H04N 21/4312* (2013.01); *H04N 21/4316* (2013.01); *H04N 21/4725* (2013.01); *H04N 21/812* (2013.01)

(58) Field of Classification Search
CPC .......... H04N 21/4722; H04N 21/4622; H04N 21/812; H04N 21/4316; H04N 21/8586
USPC ...................... 725/32–26, 109–113
See application file for complete search history.

(56) References Cited

U.S. PATENT DOCUMENTS

| | | |
|---|---|---|
| 6,008,803 A | 12/1999 | Rowe et al. |
| 6,177,931 B1 | 1/2001 | Alexander et al. |
| 6,230,324 B1 | 5/2001 | Tomita et al. |
| 6,718,551 B1* | 4/2004 | Swix et al. ............. 725/32 |
| 7,293,066 B1 | 11/2007 | Day |
| 7,444,659 B2 | 10/2008 | Lemmons |
| 7,493,636 B2 | 2/2009 | Kitsukawa et al. |
| 7,496,945 B2 | 2/2009 | Rodriguez |
| 7,739,710 B2 | 6/2010 | Kwon et al. |
| 7,839,385 B2 | 11/2010 | Hunleth et al. |
| 7,900,228 B2 | 3/2011 | Stark et al. |
| 7,992,179 B1 | 8/2011 | Kapner, III et al. |
| 8,079,054 B1* | 12/2011 | Dhawan et al. ......... 725/105 |
| 8,453,171 B2 | 5/2013 | Koplar |
| 8,522,281 B1 | 8/2013 | Sahami et al. |
| 8,607,269 B2 | 12/2013 | Needham et al. |
| 8,656,431 B2 | 2/2014 | Cavicchia |
| 8,661,466 B2* | 2/2014 | Stephens ............ G06Q 50/01 725/34 |

(Continued)

OTHER PUBLICATIONS

Makhlouf, Sam; U.S. Provisional Patent Application entitled: System and Method for Reinforcing Brand Awareness with Minimal Intrusion of the Viewer Experience under U.S. Appl. No. 61/852,114, filed Mar. 15, 2013; 37 pgs.

(Continued)

*Primary Examiner* — Hsiungfei Peng
(74) *Attorney, Agent, or Firm* — Taylor English Duma LLP

(57) ABSTRACT

Disclosed is a system and method for distributing media content, the system including a media content server, a media content receiver configured to output a signal to an associated display device. The media content server is configured to provide a media content signal to the media content receiver.

18 Claims, 9 Drawing Sheets

(56) References Cited

U.S. PATENT DOCUMENTS

Figure 1:
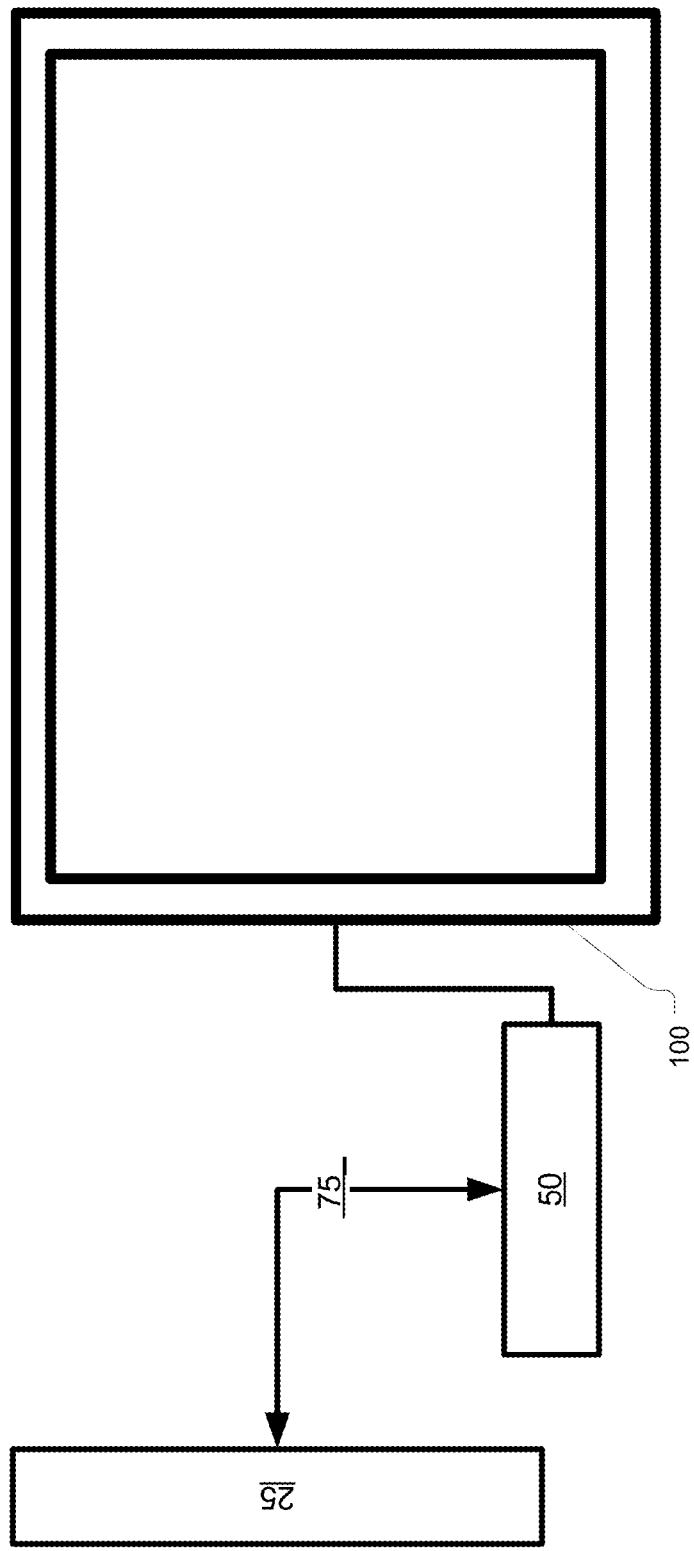

| | | | |
|---|---|---|---|
| 8,799,977 | B1 | 8/2014 | Kapner, III et al. |
| 9,049,471 | B2 | 6/2015 | Krapf et al. |
| 9,326,043 | B2 | 4/2016 | Makhlouf |
| 9,392,342 | B2 | 7/2016 | Makhlouf |
| 9,479,838 | B2 | 10/2016 | Makhlouf |
| 9,743,155 | B2 | 8/2017 | Makhlouf |
| 9,781,490 | B2 | 10/2017 | Makhlouf |
| 2001/0034883 | A1* | 10/2001 | Zigmond ............... 725/109 |
| 2003/0131357 | A1* | 7/2003 | Kim ............... 725/60 |
| 2004/0103439 | A1* | 5/2004 | MacRae et al. ............... 725/109 |
| 2004/0154040 | A1 | 8/2004 | Ellis et al. |
| 2004/0221303 | A1 | 11/2004 | Sie et al. |
| 2005/0028206 | A1 | 2/2005 | Cameron et al. |
| 2005/0076130 | A1 | 4/2005 | Anand et al. |
| 2005/0086692 | A1 | 4/2005 | Dudkiewicz et al. |
| 2005/0192946 | A1 | 9/2005 | Lu et al. |
| 2005/0251820 | A1* | 11/2005 | Stefanik et al. ............... 725/34 |
| 2005/0262539 | A1* | 11/2005 | Barton ............... G11B 27/034 725/90 |
| 2005/0278794 | A1 | 12/2005 | Leinonen et al. |
| 2006/0004892 | A1 | 1/2006 | Lunt et al. |
| 2006/0064716 | A1 | 3/2006 | Sull et al. |
| 2006/0090131 | A1* | 4/2006 | Kumagai ............... G06Q 30/02 715/700 |
| 2006/0136246 | A1 | 6/2006 | Tu |
| 2006/0136980 | A1* | 6/2006 | Fulcher ............... G06F 3/0481 725/134 |
| 2007/0124777 | A1 | 5/2007 | Bennett et al. |
| 2008/0244657 | A1 | 10/2008 | Arsenault et al. |
| 2008/0281699 | A1 | 11/2008 | Whitehead |
| 2008/0300985 | A1 | 12/2008 | Shamp |
| 2009/0007178 | A1 | 1/2009 | Artom |
| 2009/0138904 | A1 | 5/2009 | Kitsukawa |
| 2009/0141174 | A1 | 6/2009 | Hardacker et al. |
| 2009/0199242 | A1 | 8/2009 | Johnson |
| 2009/0241145 | A1 | 9/2009 | Sharma |
| 2009/0254931 | A1* | 10/2009 | Pizzurro ............... G06Q 30/02 725/5 |
| 2009/0327346 | A1 | 12/2009 | Teinila |
| 2010/0175090 | A1 | 7/2010 | Cordray |
| 2010/0199312 | A1 | 8/2010 | Chang et al. |
| 2010/0269140 | A1 | 10/2010 | Shin et al. |
| 2011/0107372 | A1 | 5/2011 | Walter |
| 2011/0126226 | A1 | 5/2011 | Makhlouf |
| 2011/0126234 | A1 | 5/2011 | Makhlouf |
| 2011/0126249 | A1 | 5/2011 | Makhlouf |
| 2011/0292283 | A1 | 12/2011 | Stephens |
| 2012/0278727 | A1* | 11/2012 | Ananthakrishnan ............... G06F 3/0486 715/748 |
| 2012/0291104 | A1 | 11/2012 | Hasek |
| 2013/0046641 | A1* | 2/2013 | Devree ............... G06Q 30/0277 705/14.69 |
| 2013/0169510 | A1* | 7/2013 | Tahara ............... G09G 5/00 345/1.3 |
| 2013/0276008 | A1 | 10/2013 | Wu |
| 2013/0305273 | A1 | 11/2013 | Hadfield et al. |
| 2014/0157299 | A1 | 6/2014 | Alcala et al. |
| 2014/0173652 | A1 | 6/2014 | Patel et al. |
| 2014/0207565 | A1 | 7/2014 | Jacobs |
| 2014/0259045 | A1* | 9/2014 | Sangal ............... 725/23 |
| 2016/0345076 | A1 | 11/2016 | Makhlouf |
| 2016/0360261 | A1 | 12/2016 | Makhlouf |
| 2017/0353774 | A1 | 12/2017 | Makhlouf |
| 2018/0098017 | A1 | 4/2018 | Vaysman et al. |

OTHER PUBLICATIONS

Makhlouf, Samir B.; U.S. Patent Application entitled: System and Method for Engagement and Distribution of Media Content, U.S. Appl. No. 14/310,018, filed Jun. 20, 2014; 46 pgs.

Makhlouf, Samir B.; Non-Final Office Action for U.S. Appl. No. 14/310,018, filed Jun. 20, 2014, dated Sep. 21, 2015, 22 pgs.

Makhlouf, Samir B.; Notice of Allowance for U.S. Appl. No. 14/310,018, filed Jun. 20, 2014, dated Nov. 2, 2015, 5 pgs.

Makhlouf, Samir B.; U.S. Continuation Application entitled: System and Method for Engagement and Distribution of Media Content having U.S. Appl. No. 14/925,409, filed Oct. 28, 2015, 45 pgs.

Makhlouf, Samir B.; Non-Final Office Action for U.S. Appl. No. 14/925,409, filed Oct. 28, 2015, dated Dec. 10, 2015, 19 pgs.

Makhlouf, Samir B.; Extended European Search Report for serial No. 14183901.9, filed Sep. 8, 2014, dated Nov. 12, 2015, 9 pgs.

Makhlouf, Samir B.; Notice of Allowance for U.S. Appl. No. 14/925,409, filed Oct. 28, 2015, dated Feb. 1, 2016, 9 pgs.

Makhlouf, Samir; Final Office action for U.S. Appl. No. 12/592,369, filed Nov. 24, 2009, dated Nov. 27, 2013, 14 pgs.

Makhlouf, Samir; Non-Final Office action for U.S. Appl. No. 12/592,369, filed Nov. 24, 2009, dated Nov. 26, 2012, 10 pgs.

Makhlouf, Samir; Non-Final Office action for U.S. Appl. No. 12/592,369, filed Nov. 24, 2009, dated May 20, 2013, 11 pgs.

Makhlouf, Samir; Non-Final Office action for U.S. Appl. No. 12/592,369, filed Nov. 24, 2009, dated May 5, 2015, 12 pgs.

Makhlouf, Samir; U.S. Patent Application entitled: System and Method for Distributing Media Content From Multiple Sources having U.S. Appl. No. 12/592,369, filed Nov. 24, 2009, 99 pgs.

Makhlouf, Sam; Applicant Initiated Interview Summary for U.S. Appl. No. 12/592,403, filed Nov. 24, 2009, dated Dec. 23, 2014, 3 pgs.

Makhlouf, Sam; Applicant Initiated Interview Summary for U.S. Appl. No. 12/592,403, filed Nov. 24, 2009, dated Mar. 28, 2014, 3 pgs.

Makhlouf, Sam; Final Office Action for U.S. Appl. No. 12/592,403, filed Nov. 24, 2009, dated Oct. 15, 2012, 12 pgs.

Makhlouf, Sam; Final Office Action for U.S. Appl. No. 12/592,403, filed Nov. 24, 2009, dated Nov. 17, 2014, 10 pgs.

Makhlouf, Sam; Final Office Action for U.S. Appl. No. 12/592,401, filed Nov. 24, 2009, dated Oct. 15, 2012, 21 pgs.

Makhlouf, Sam; Final Office Action for U.S. Appl. No. 12/592,403, filed Nov. 24, 2009, dated Nov. 7, 2013, 12 pgs.

Makhlouf, Sam; Non-Final Office Action for U.S. Appl. No. 12/592,401, filed Nov. 24, 2009, dated Jan. 30, 2012, 25 pgs.

Makhlouf, Sam; Non-Final Office Action for U.S. Appl. No. 12/592,401, filed Nov. 24, 2009, dated May 1, 2013, 25 pgs.

Makhlouf, Sam; Non-Final Office Action for U.S. Appl. No. 12/592,403, filed Nov. 24, 2009, filed Jul. 12, 2013, 16 pgs.

Makhlouf, Sam; Non-Final Office Action for U.S. Appl. No. 12/592,403, filed Nov. 24, 2009, dated Feb. 1, 2012, 16 pgs.

Makhlouf, Sam; Non-Final Office Action for U.S. Appl. No. 12/592,403, filed Nov. 24, 2009, dated May 26, 2015, 12 pgs.

Makhlouf, Sam; Non-Final Office Action for U.S. Appl. No. 12/592,403, filed Nov. 24, 2009, dated Apr. 24, 2014, 11 pgs.

Makhlouf, Sam; U.S. Patent Application entitled: Media Content Distribution System and Method, having U.S. Appl. No. 12/592,401, filed Nov. 24, 2009, 98 pgs.

Makhlouf, Sam; U.S. Patent Application entitled: System and Method for Time Shifting Delivery of Media Content, having U.S. Appl. No. 12/592,403, filed Nov. 24, 2009, 99 pgs.

Makhlouf, Samir B.; Issue Notification for U.S. Appl. No. 14/310,018, filed Jun. 20, 2014, dated Apr. 6, 2016, 1 pg.

Makhlouf, Samir B.; Notice of Allowance for U.S. Appl. No. 14/310,018, filed Jun. 20, 2014, dated Mar. 10, 2016, 17 pgs.

Makhlouf, Samir B.; Notice of Allowance for U.S. Appl. No. 14/925,409, filed Oct. 28, 2015, dated Mar. 16, 2016, 17 pgs.

Makhlouf, Samir B.; U.S. Continuation Application entitled: System and Method for Engagement and Distribution of Media Content having U.S. Appl. No. 15/081,353, filed Mar. 25, 2016, 44 pgs.

Makhlouf, Samir B.; Issue Notification for U.S. Appl. No. 14/925,409, filed Oct. 28, 2015, dated Mar. 22, 2016, 1 pg.

Makhlouf, Samir, B.; U.S. Patent Application entitled: System and Method for Engagement and Distribution of Media Content having U.S. Appl. No. 15/226,810, filed Aug. 2, 2016, 90 pgs.

Makhlouf, Samir; Notice of Allowance for U.S. Appl. No. 12/592,369, filed Nov. 24, 2009, dated Mar. 3, 2016, 14 pgs.

Makhlouf, Samir; Supplemental Notice of Allowance for U.S. Appl. No. 12/592,369, filed Nov. 24, 2009, dated Jun. 22, 2016, 6 pgs.

(56) References Cited

OTHER PUBLICATIONS

Makhlouf, Samir; U.S. Patent Application entitled: System and Method for Distributing Media Content From Multiple Sources having U.S. Appl. No. 15/226,085, filed Aug. 2, 2016, 79 pgs.

Makhlouf, Samir B.; Examiner Interview Summary for U.S. Appl. No. 15/081,353, filed Mar. 25, 2016, dated Mar. 20, 2017, 2 pgs.

Makhlouf, Samir B.; Non-Final Office Action for U.S. Appl. No. 15/081,353, filed Mar. 25, 2016, dated Dec. 9, 2016, 31 pgs.

Makhlouf, Samir, B.; Non-final Office Action for U.S. Appl. No. 15/226,810, filed Aug. 2, 2016, dated Mar. 3, 2017, 28 pgs.

Makhlouf, Samir; Issue Notification for U.S. Appl. No. 12/592,369, filed Nov. 24, 2009, dated Oct. 5, 2016, 1 pg.

Makhlouf, Samir; Response to Amendment under Rule 312 for U.S. Appl. No. 12/592,369, filed Nov. 24, 2009, dated Sep. 16, 2016, 8 pgs.

Makhlouf, Samir B.; Notice of Allowance for U.S. Appl. No. 15/081,353, filed Mar. 25, 2016, dated Mar. 31, 2017, 15 pgs.

Makhlouf, Samir B.; Applicant Initiated Interview Summary for U.S. Appl. No. 15/226,810, filed Aug. 2, 2016, dated Apr. 27, 2017, 3 pgs.

Makhlouf, Samir, B.; Notice of Allowance for U.S. Appl. No. 15/226,810, filed Aug. 2, 2016, dated May 30, 2017, 9 pgs.

Makhlouf, Samir B.; Issue Notification for U.S. Appl. No. 15/081,353, filed Mar. 25, 2016, dated Aug. 2, 2017, 1 pg.

Makhlouf, Samir B.; Summons to Attend Oral Proceedings for Patent Application Serial No. 14183901.9, filed Mar. 8, 2014, dated Jun. 22, 2017, 10 pgs.

Makhlouf, Samir, B.; Issue Notification for U.S. Appl. No. 15/226,810, filed Aug. 2, 2016, dated Sep. 13, 2017, 1 pg.

Makhlouf, Samir, B.; Non-Final Office Action for U.S. Appl. No. 15/226,085, filed Aug. 2, 2016, dated Nov. 16, 2017, 35 pg.

Makhlouf, Samir B.; Requirement for Restriction/Election for U.S. Appl. No. 15/684,515, filed Aug. 23, 2017, dated Mar. 7, 2018, 22 pgs.

Makhlouf, Samir B.; Non-Final Office Action for U.S. Appl. No. 15/226,085, filed Aug. 2, 2016, dated May 15, 2018, 13 pgs.

Froogle Beta; "Froogle", entire document, Jun. 24, 2004, 1 pg.

Makhlouf, Samir B.; Non-Final Office Action for U.S. Appl. No. 15/684,515, filed Aug. 23, 2017, dated May 30, 2018, 14 pgs.

Steiner, Ina; Article entitled: "New Google Retail Search Engine Gives Small Online Merchants Exposure" Dec. 12, 2002, 7 pgs.

Makhlouf, Samir B.; Final Office Action for U.S. Appl. No. 15/684,515, filed Aug. 23, 2017, dated Nov. 27, 2018, 12 pgs.

Makhlouf, Samir B.; Final Office Action for U.S. Appl. No. 15/226,085, filed Aug. 2, 2016, dated Oct. 4, 2018, 18 pgs.

* cited by examiner

SYSTEM AND METHOD FOR REINFORCING BRAND AWARENESS WITH MINIMAL INTRUSION ON THE VIEWER EXPERIENCE

CROSS-REFERENCE TO RELATED APPLICATIONS

This application claims the benefit of U.S. Provisional Application No. 61/852,114, filed Mar. 15, 2013, and entitled "SYSTEM AND METHOD FOR REINFORCING BRAND AWARENESS WITH MINIMAL INTRUSION ON THE VIEWER EXPERIENCE," the entire disclosure of which is hereby incorporated by reference herein.

FIELD OF THE INVENTION

The proposed system and method is generally directed to building brand or product awareness with minimal disruption of the audience/viewer experience when viewing visually perceivable media content, such as, movies, TV, streaming video, still imagery and other motion pictures/video content.

BACKGROUND

Inserting/embedding advertising within media content is known. However, embedded advertising has often been keyed with an interactive element which either acts to highlight the advertising or advertised product or provide a link to other information about the product/services, independent of the content which a viewer or audience member may currently be viewing. In short, the interactive element or required efforts to access information concerning the product/services advertised in the media content act as a (often unwanted) interruption to the user/viewer/audience member (who is engaged in viewing of the media content) experience. The result is that many viewers/users choose not to pursue further information via an interactive link and instead end up completely having no awareness (other than perhaps negative awareness) of the advertised product/service/brand etc. after the media content has been viewed completely. If anything is remembered by the user/viewer, it is more likely the fact that someone's advertising interrupted the users/viewers of media content as they were pleasurefully engaged in viewing same.

DISCUSSION

In order to overcome the disadvantages of known methods of embedding advertising within media content and to further enhance user/viewer/audience retention of an advertised product/service/brand, a system and method is proposed that provides for an active icon or other indicia to be brought into view on a display device during the display of media content on the display device to alert or otherwise entice viewers/users interest in the advertisement or advertised product/service/company/brand.

In one embodiment, the icon or image (i.e. awareness icon) is brought into view within a main viewing area on the display along with media content, such as a movie, which is in the process of being displayed on the display for viewing by users/viewers.

After a period of time the icon may be moved outside of the main viewing area shared with the media content and left resident in a second area or corner of the display area, in which the icon remains visible to viewers/users, but not in view within the main viewing area substantially shared with the media content then currently being displayed for viewing. The icon may be fashioned as a company or product logo or trademark or other indicia associated with, for example, a particular product, brand or service or company.

The icon may be an active icon which is configured to provide a hyperlink to a URL (universal resource locator) that is associated with, for example, information about services, products, companies or brands advertised, either via, for example, product placement within a scene of media content, or in a dedicated commercial/advertisement that is presented before, during or after the display of media content. Alternatively, the icon may provide a hyperlink to a storefront that is associated with a particular product/service/brand/company.

By bringing the icon into view on the display concurrent with on-going media content and for a predetermined period of time allowing it to "linger" within the view of the user/viewer, the attention/interest of the user/viewer in the icon (and thus the awareness of the advertisement and advertised product/service/brand/logo, etc.) can be developed and/or heightened/reinforced.

By moving the icon from the main viewing area shared with the media content to a second viewing area located outside of the main viewing area, for example, near the perimeter of the main viewing area, a user/viewer may continue to view the media content uninterrupted, the advertisers brand, product/service, logo, identity can continue to maintain a presence on the display where it can be viewed by viewers/user. Such a configuration increases the opportunity for users/viewers to become familiar with the brand, product, logo etc. and thus increases the chances the product, brand, logo, etc. will continue to be remembered by the users/viewers after the media content is over and the display device has been turned off.

Alternatively, the icon may be moved to a second viewing area that is displayed on a second display device or on a second window alternatively accessible on a single display device by toggling/scrolling/sweeping from a first window in which the main viewing area is displayed to a second window in which the second viewing area is displayed.

Users can be briefly introduced to the advertised product/services. By moving the icon outside of the main viewing area shared with the media content, the icon can remain in the field of view of the user whereby it can act to enhance/reinforce the user's awareness or interest in the advertised product/services. At the same time, the continued presentation of the media content is not interrupted and thereby is less likely to be viewed as a negative occurrence which causes the viewer/user to think poorly of the advertiser/product/brand or wholly avoid or otherwise bypass the advertised products/services.

In one embodiment, the media content displayed concurrent with awareness icon comprises advertising content. This advertising content could be a typical advertisement as is commonly delivered to cable and satellite TV subscribers. In this case, the awareness icon may remain on the display after the advertising content (AD) has concluded. The remaining awareness icon will act to reinforce, for example, the product/brand that was subject of the completed advertising content. The awareness icon may remain on the display for a long or short period of time.

In another embodiment, the media content displayed concurrent with awareness icon comprises typical television programming or movie programming. In such a case, the awareness icon may remain on the display after the television/movie programming has concluded. The remaining awareness icon will act to reinforce, for example, the product/brand that was introduced during the television/movie programming.

In another embodiment, the media content receiver may be configured to receive user input from a remote user input device (not shown). This input may be used to instruct the system to "mark" a particular awareness icon for saving into a "favorites" or "follow-up" list. The system may then provide subsequent reminders to the user via reminders displayed on the display device 100. Further, the system may initiate transactional steps to order and pay for the purchase of items associated with a displayed awareness icon, or to have an associated server/product provider follow-up with additional info sent to the user via a previously identified e-mail address or social media identity.

Description of Process

Step one: display icon or image within a viewing area concurrent with media content.

Step two: after predetermined period of time, remove displayed icon or image from viewing area and into a secondary viewing area whereby displayed icon is still visible but not distracting to users/audience members.

Step three: leave displayed icon within secondary viewing area for predetermined period of time after media content has completed its display in the viewing area.

Shown in FIG. 1-3B:

Media Content Server 25
Media content receiver 50
Signal Output 75
Display device 100
Window 150
Second Window 175
Media content 200
Main viewing area 300
Awareness icon 400
Secondary viewing area 500

FIG. 1 is a diagram depicting a system in which a media content distribution server 25 is configured to provide a signal 75 to a media content receiver 50 which then outputs a signal to display device 100. Media content receiver 50 may also be configured to receiver input/signals/feedback from the display device 100 or remote user control/input devices (not shown). Media content distribution server 25 may be configured to make delivery of signal 75 to the media content receiver via satellite transmission, internet/IP based transmission, or dedicated analog or digital cable television distribution systems.

FIG. 2A-FIG. 2D are diagrams showing a display device 100 on which media content 200 is being displayed in a window 150 and within a main viewing area 300 for viewing. The media content 200 is displayed on the display device 100 in accordance with a signal output 75 from a media content receiver 50 (FIG. 1).

Figure 2A:
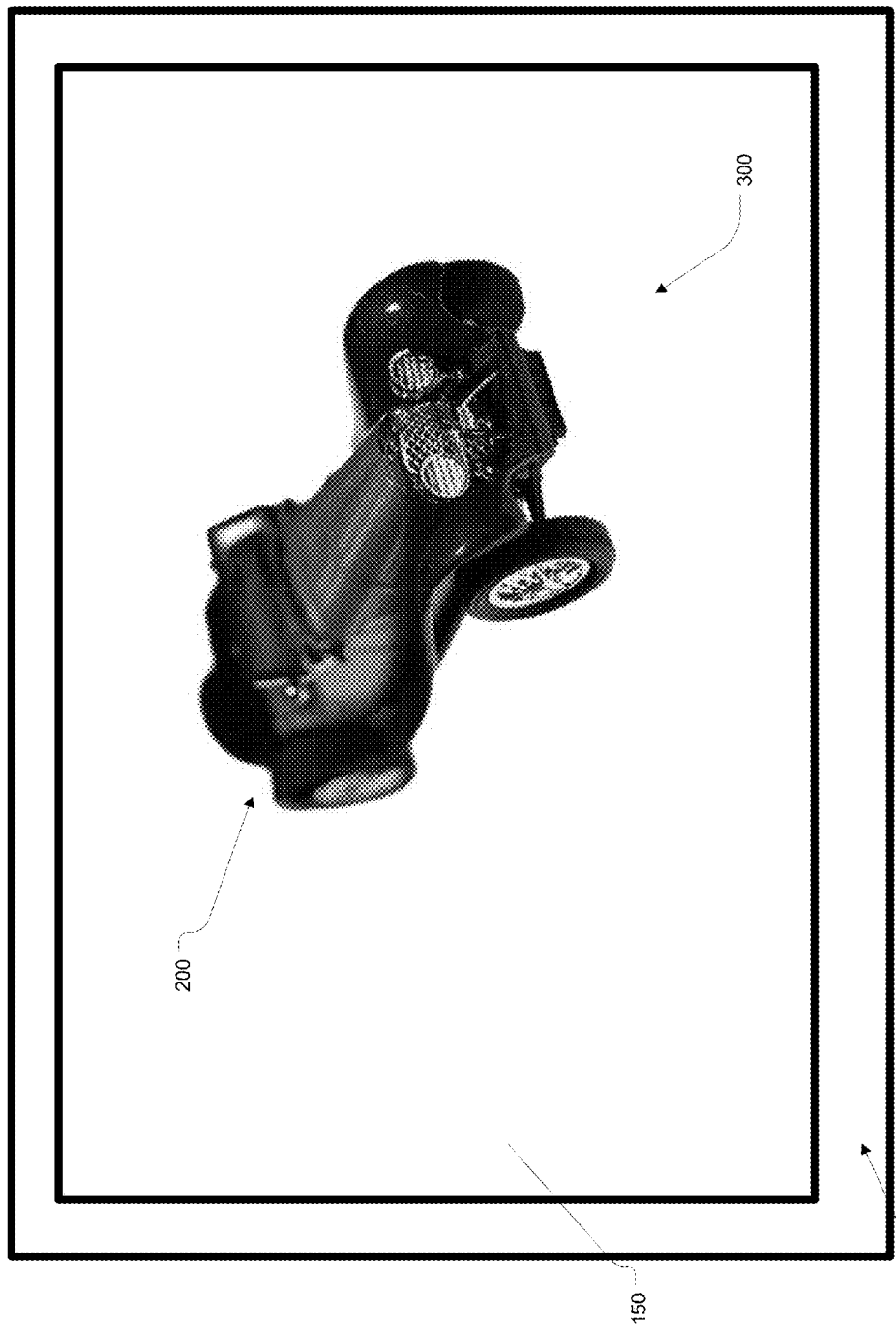
Figure 2B:
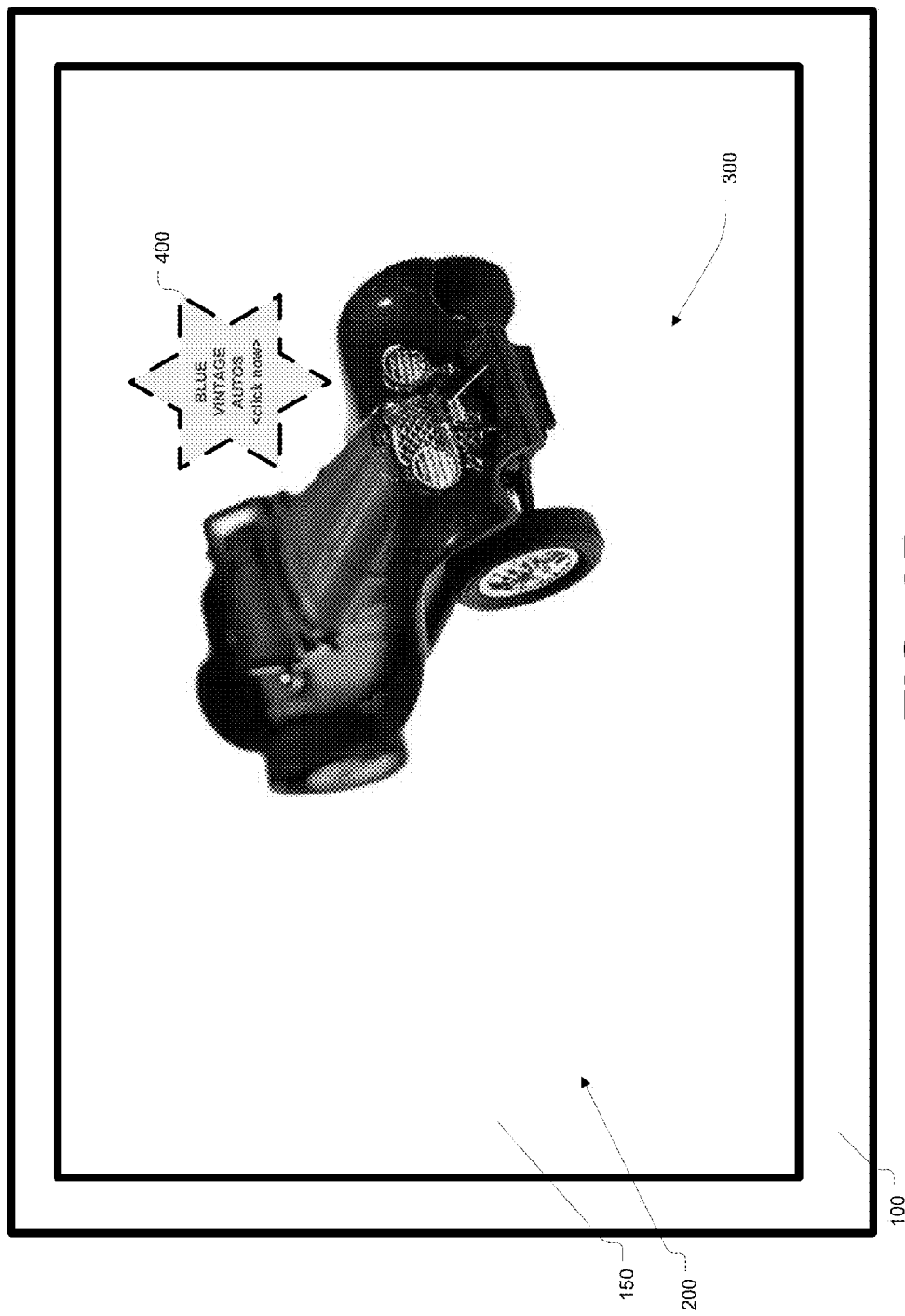

FIG. 2A is a diagram showing a display device 100 on which media content 200 is being displayed in a main viewing area 300 for viewing. The media content distribution server 25 (see FIG. 1) may be configured to provide a signal 75 to media content receiver 50 that, at a predetermined time (or upon the occurrence of a predetermined viewer/user input or signaling embedded within the media content delivery stream/signal) an awareness icon 400 is displayed on the display 100 concurrent with the media content 200. The awareness icon 400 may remain in view in the main viewing area 300 for a predetermined period of time (or until a predefined event/input or signal is received by the media content receiver 50).

Figure 2C:
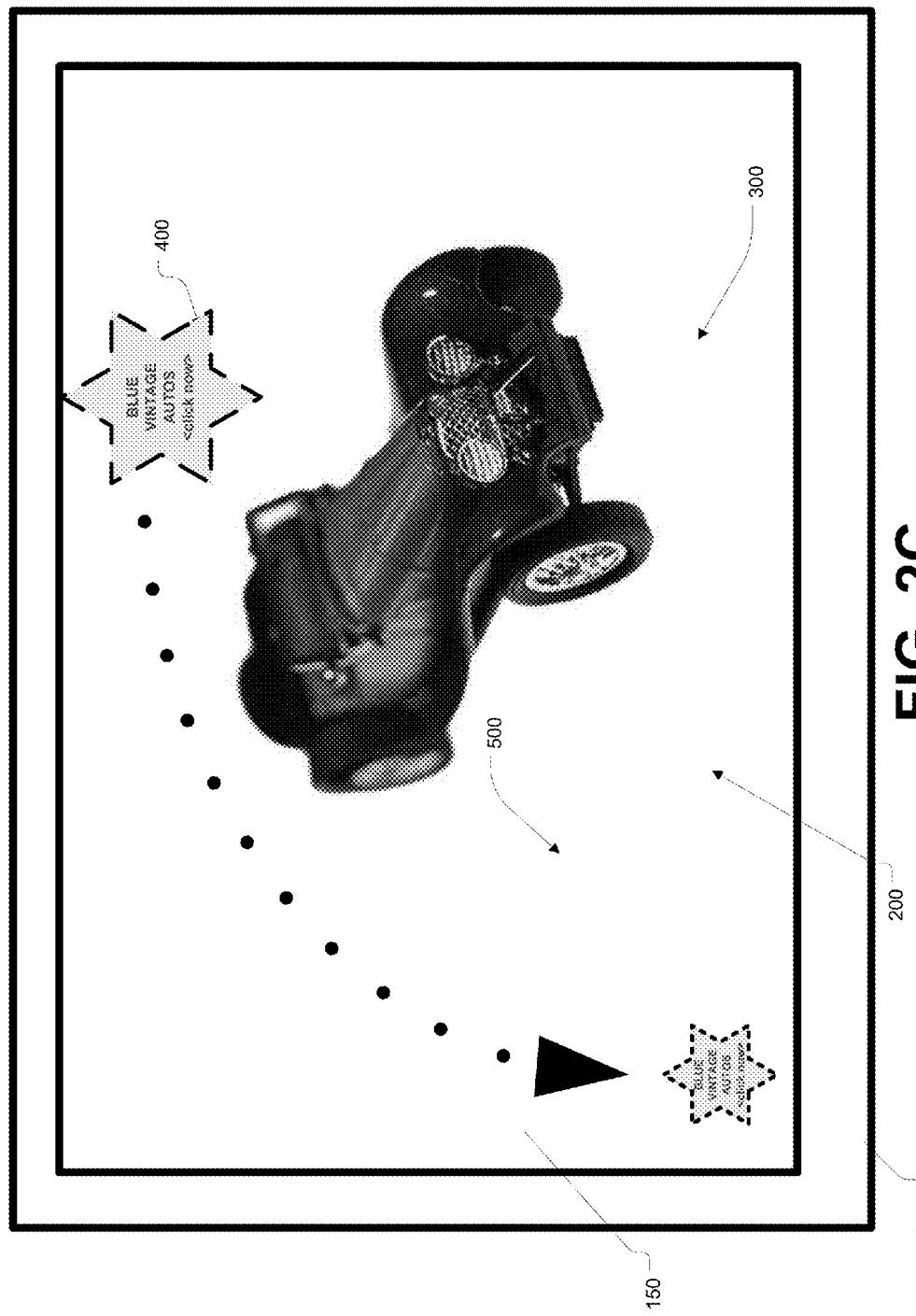
Figure 2D:
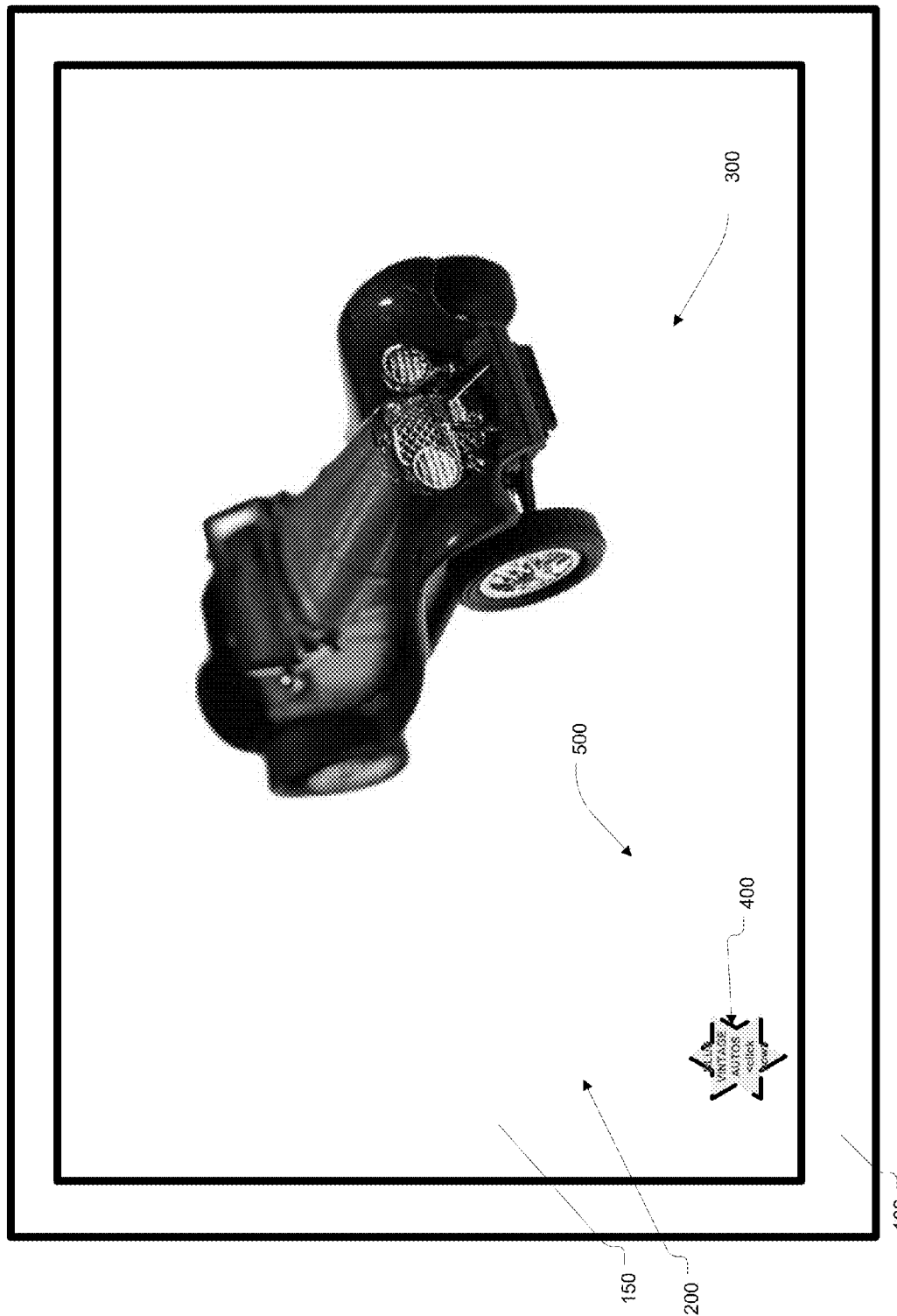

FIG. 2C and FIG. 2D are diagrams showing a display device 100 on which media content 200 is being displayed and the awareness icon 400 is transitioning (FIG. 3A) from a location in a main viewing area 300 to a location within an area 500 (second viewing area) along the perimeter of the main viewing area 300 (FIG. 3B) where it continues to remain within view of viewers, at least for a period of time.

FIG. 3A-FIG. 3D are diagrams showing a display device 100 on which media content 200 is being displayed in a window 150 and within a main viewing area 300 for viewing. The media content 200 is displayed on the display device 100 in accordance with a signal output 75 from a media content receiver 50 (FIG. 1). A second window 175 shares the display 100 with window 150.

Figure 3A:
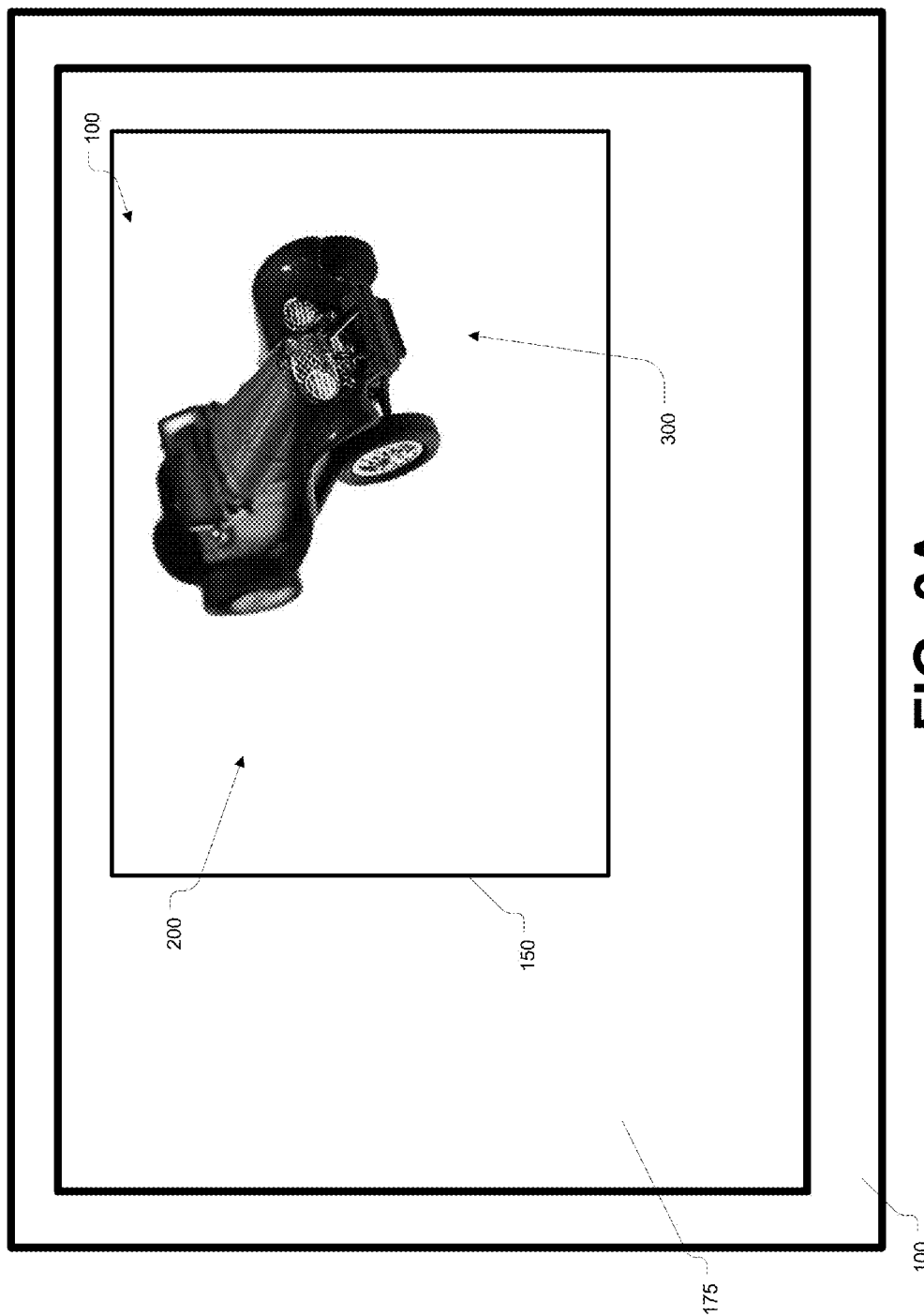
Figure 3B:
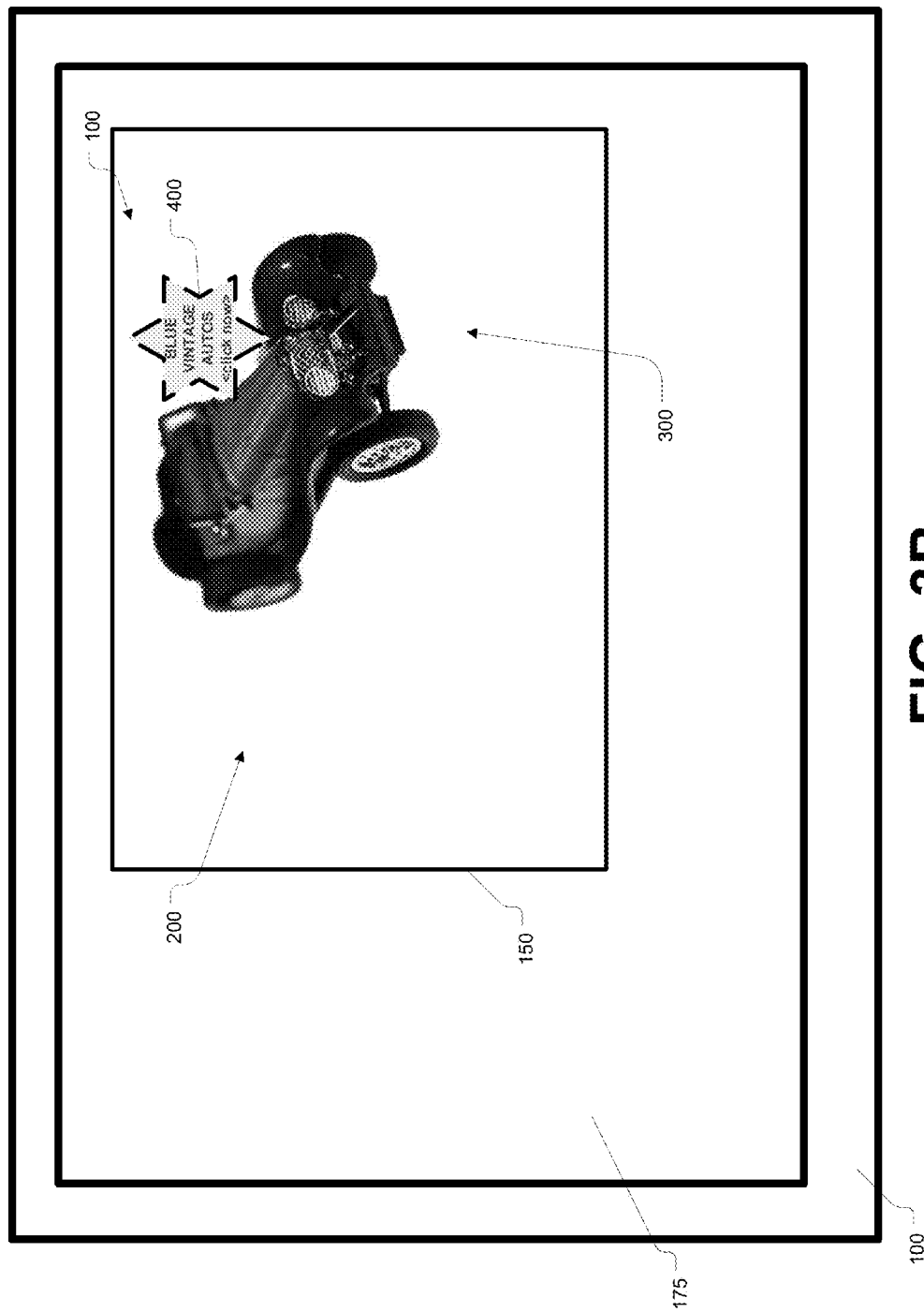

FIG. 3B is a diagram showing display of an awareness icon 400 in the main viewing area 300 within window 150.

Figure 3C:
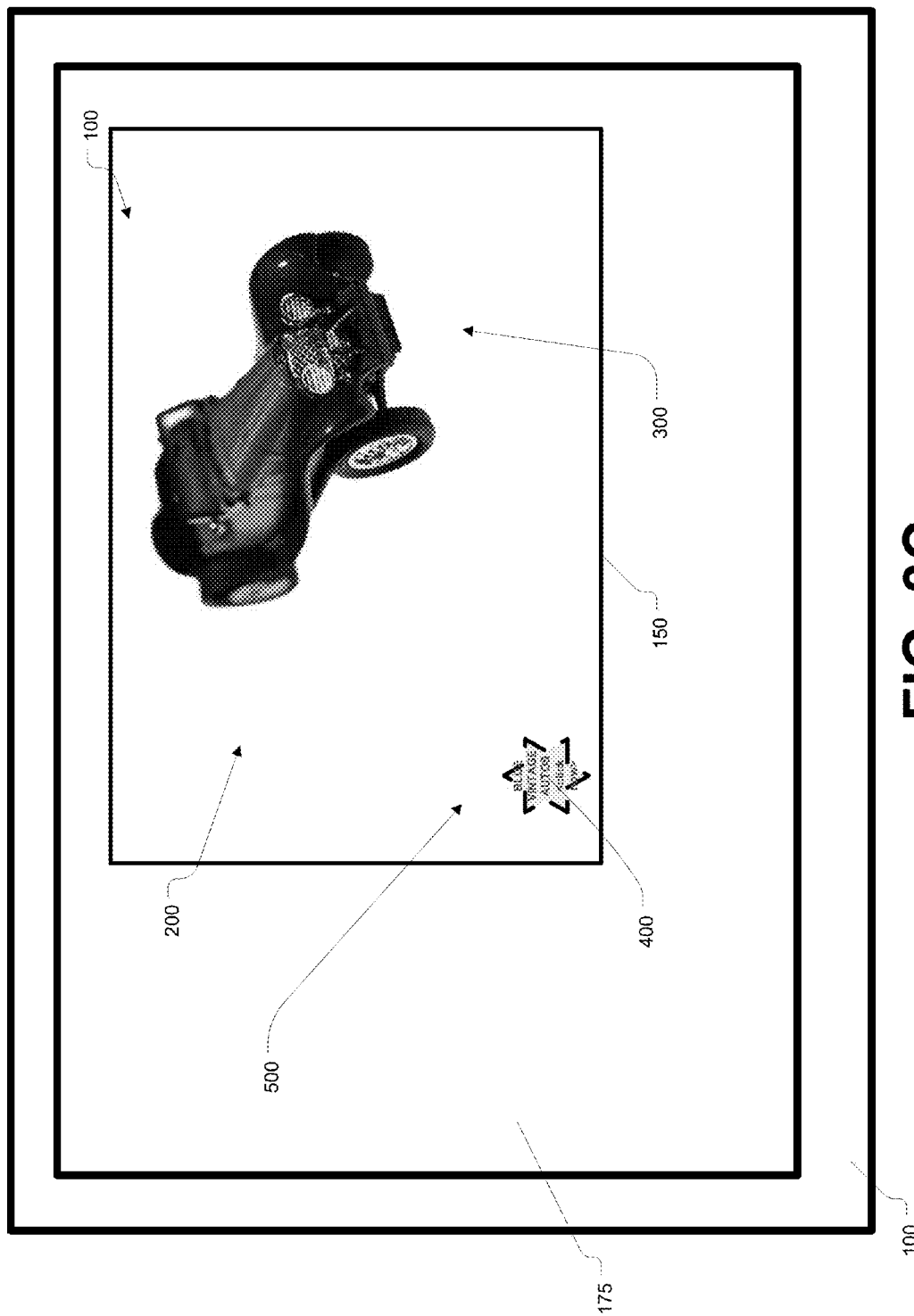

FIG. 3C is a diagram showing an awareness icon after it has transitioned to a location within secondary viewing area 500 which is located within the window 150.

Figure 3D:
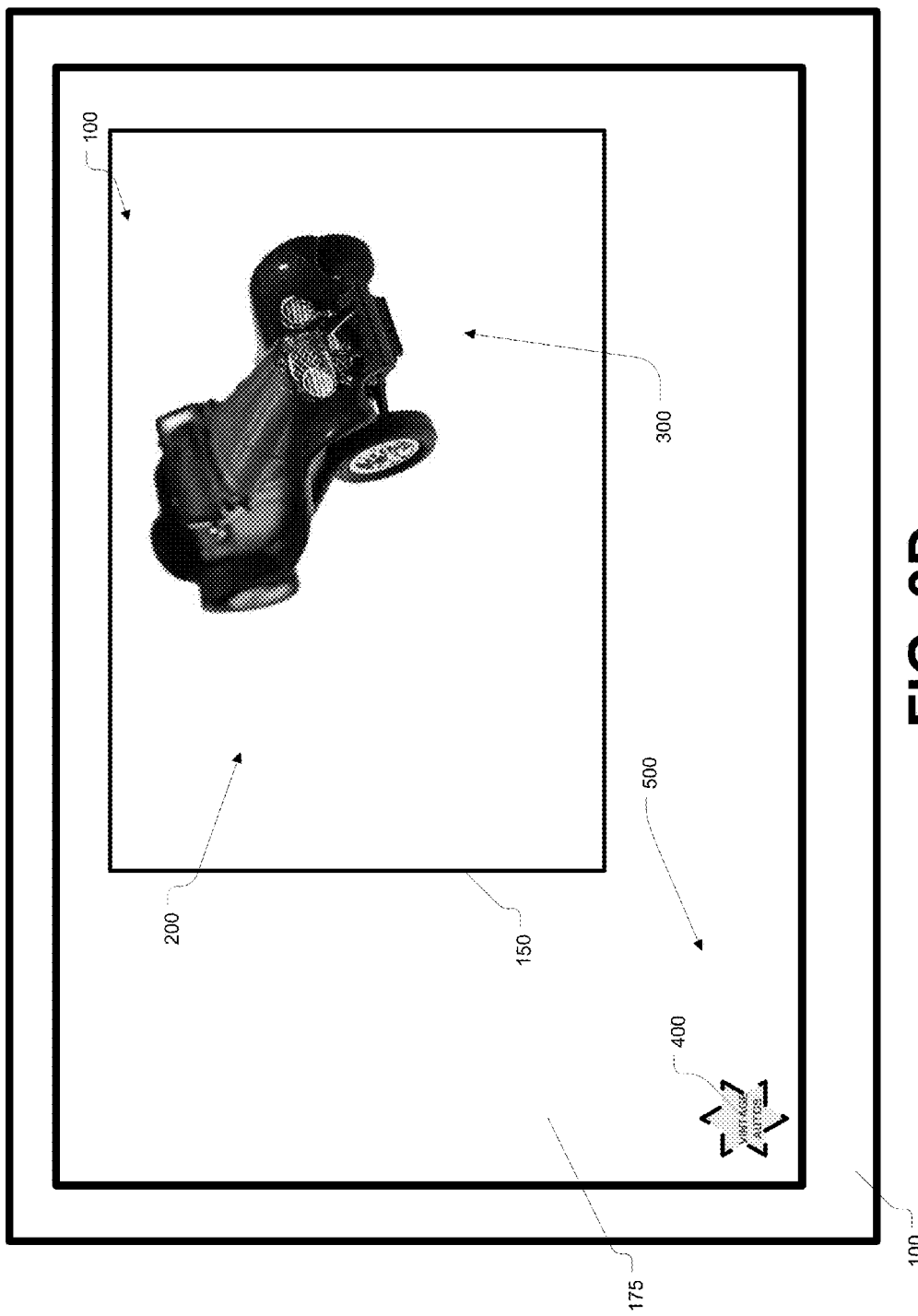

FIG. 3D is a diagram showing an awareness icon after it has transitioned to a location outside window 150 and to a secondary viewing area 500 which is located within the window 175.

Windows 150 and 175 may be displayed on a single display device. Alternatively, each window may be independently displayed on separate display devices.

Awareness icon 400 may be configured to flash, swirl, rotate or move while in the main viewing area 300 in order to attract viewer/user attention or to indicate that a time period is open during which user input via related input devices can be provided to, for example, the media content receiver 50.

Once the awareness icon 400 is moved into the area 500, it may be reduced in size or brightness so as to reduce its "presence" relative to the concurrently displayed media content. Further, any movement of the awareness icon 400 may be reduced to provide a more subtle/less distracting character to the awareness icon. Further, the awareness icon 400 may appear intermittently/periodically.

The applicability of the proposed system and method is broad. Use and implementation in typical "cable TV" or "satellite TV" or IP/packet-based distribution systems/services, such as those provided by COMCAST® or TIME-WARNER®, DISH® network or DIRECTV® and the like, is contemplated.

The proposed system and method could also be implemented with video display services including IP/packet based streaming video service providers such as YOU-TUBE™, HuLu™, NetFLix™, AMAZON™, Google PLAY™. It could also be implemented with, or incorporated into, over the top (OTT) content distribution systems/services/devices, such as those offered by Boxee™, TiVO™, RoKU™, AppleTV™, VuDu™ and the like.

What is claimed:

1. A system for distributing media content comprising:
  a media content server; and
  a media content receiver configured to
    receive a media content signal from the media content server, the media content signal including media content and an icon, the media content including broadcast television programming and a plurality of advertisements, the icon comprising indicia associated with a particular advertisement of the plurality of advertisements;
    output the media content to a display device;
    display the icon concurrent with the media content in a main viewing area of the display device;

move the icon from the main viewing area to a secondary viewing area of the display device located outside of the main viewing area after a trigger event has occurred;

visibly maintain the icon on the secondary viewing area of the display device for a predetermined amount of time after removal of the media content from the main viewing area, wherein the icon is an active icon including a hyperlink to a storefront associated with the icon indicia;

preceding an expiration of the predetermined amount of time, detect a user interaction with the icon, wherein the user interaction comprises receiving user input from a remote user input device, and upon detecting the user interaction with the icon, move the icon, from the secondary viewing area or the main viewing area of the display device to a second display device.

2. The system of claim 1, wherein the secondary viewing area is presented on one of a second display device and a second window alternatively accessible on the display device.

3. The system of claim 1, wherein the trigger event is selected from the group consisting of an expiration of the predetermined period of time, an occurrence of a predefined event, and a receipt of a user input signal.

4. The system of claim 1, wherein the media content receiver is further configured to receive the user input from the remote user input device to save a particular icon.

5. The system of claim 4, wherein the display device is a first display device, wherein the media content receiver is further configured to provide subsequent reminders of the particular icon on at least one of the first display device and the second display device.

6. The system of claim 4, wherein the media content receiver is further configured to communicate with a service/product provider associated with the particular icon to initiate follow-up communications between the service/product provider and a user.

7. The system of claim 6, wherein the follow-up communications comprise e-mail messages to the user.

8. The system of claim 6, wherein the follow-up communications comprise social media messages to the user.

9. The system of claim 1, wherein the indicia is a logo associated with the particular advertisement.

10. A computer-implemented method comprising:

receiving a media content signal including media content and an icon;

displaying an icon within a main viewing area of a display device concurrently with the media content, the media content comprising broadcast television programming and a plurality of advertisements, the icon comprising indicia associated with a particular advertisement of the plurality of advertisements;

after a first period of time, moving the icon from the main viewing area and presenting the icon in a secondary viewing area of the display device, wherein the secondary viewing area is located outside of the main viewing area, and wherein the icon remains visible;

removing the media content from the main viewing area while visibly maintaining the icon on the display device for a second period of time;

after the second period of time, removing the icon from the secondary viewing area, wherein the icon is an active icon including a hyperlink to a storefront associated with the icon indicia;

preceding an expiration of the second period of time, detect a user interaction with the icon, wherein the user interaction comprises receiving user input from a remote user input device; and upon detecting the user interaction with the icon, move the icon, from the secondary viewing area or the main viewing area of the display device to a second display device.

11. The computer-implemented method of claim 10, wherein a media content server is configured to deliver a signal to a media content receiver, and wherein the media content receiver causes the icon to be displayed on the display device concurrently with the media content.

12. The computer-implemented method of claim 10, wherein the secondary viewing area is a presented on a second display device.

13. The computer-implemented method of claim 10, wherein the secondary viewing area is presented at a second window alternatively accessible on the display device.

14. The computer-implemented method of claim 10, wherein the display device is a first display device, the method further comprising:

receiving user input from the remote user input device to save a particular icon; and providing subsequent reminders of the particular icon on at least one of the first display device and the second display device.

15. The computer-implemented method of claim 14, the method further comprising communicating with a provider associated with the particular icon to initiate follow-up communications between the provider and a user, the provider providing at least one of a product and a service.

16. The computer-implemented method of claim 15, wherein the followup communications comprise e-mail messages to the user.

17. The computer-implemented method of claim 15, wherein the followup communications comprise social media messages to the user.

18. The computer-implemented method of claim 10, wherein the indicia is a logo associated with the particular advertisement.

* * * * *